(12) United States Patent
Luo

(10) Patent No.: US 6,888,588 B2
(45) Date of Patent: May 3, 2005

(54) LIQUID CRYSTAL DISPLAY PANEL

(75) Inventor: Fang Chen Luo, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 49 days.

(21) Appl. No.: 10/354,343

(22) Filed: Jan. 29, 2003

(65) Prior Publication Data

US 2003/0142252 A1 Jul. 31, 2003

(30) Foreign Application Priority Data

Jan. 29, 2002 (TW) ........................................ 91101452 A

(51) Int. Cl.[7] ........................ G02F 1/136; G02F 1/1335
(52) U.S. Cl. ........................................ 349/44; 349/106
(58) Field of Search ........................ 349/44, 106, 138, 349/43

(56) References Cited

U.S. PATENT DOCUMENTS

| | | | | |
|---|---|---|---|---|
| 5,943,107 A | * | 8/1999 | Kadota et al. ................. | 349/44 |
| 5,946,059 A | * | 8/1999 | Yamazaki et al. ............. | 349/43 |
| 6,466,281 B1 | * | 10/2002 | Huang et al. .................. | 349/44 |
| 2001/0048490 A1 | | 12/2001 | Lim et al. ....................... | 349/44 |

* cited by examiner

*Primary Examiner*—Toan Ton
(74) *Attorney, Agent, or Firm*—Ladas & Parry

(57) ABSTRACT

A LCD panel. The LCD panel includes first and second substrates, a black matrix, a color filter, a composite layer, a plurality of pixel elements, a transparent conductive layer, and a liquid crystal layer. The substrates are opposed to each other. The black matrix is disposed on the first substrate, and the color filter is disposed on the first substrate and at least a portion of the black matrix. The composite layer is disposed on the color filter and the black matrix. The pixel elements corresponding to the color filter are disposed on the composite layer and arranged as array. The transparent conductive layer is disposed on the second substrate. The liquid crystal layer formed between the first and second substrates.

30 Claims, 2 Drawing Sheets

LIQUID CRYSTAL DISPLAY PANEL

BACKGROUND OF THE INVENTION

1. Field of the Invention

The present invention relates in general to a liquid crystal display (LCD) panel. In particular, the present invention relates to thin film transistors (TFTs), color filters, black matrixes disposed on the same substrate of the LCD panel.

2. Description of the Related Art

LCDs have the advantages of low power consumption, thin profiles, light weight and low driving-voltage. LCDs have been put to practical use with personal computers, navigation systems, hand held gaming devices, projectors, view finders and portable electronics (watches, electronic calculators and televisions).

In a conventional thin film transistor liquid crystal display (TFT-LCD) panel, the backlight module results in high power consumption. Varied TFT structures and manufacturing approaches such as increasing the backlight power or increasing the transparency of the LCD have been disclosed, to reduce power consumption.

FIG. 1 is a cross sectional diagram showing a conventional LCD panel structure. The conventional LCD panel 10 includes: two glass substrates (bottom substrate 101 and top substrate 110), a black matrix 109, a color filter 112, a passivation layer 107, a transparent conductive layer 106 such as indium tin oxide (ITO), a plurality of TFTs (herein, only one TFT is shown) 105, and a liquid crystal layer 111. The glass substrates 101 and 110 are oppositely disposed each other. The black matrix 109 is disposed on the top substrate 110, and the color filter 112 is disposed on the top substrate 110 and the black matrix 109. The passivation layer 107 and the transparent conductive layer 106 are sequentially disposed on the color filter 112. TFTs 105 are disposed and arranged on the bottom substrate 101 to create TFT array. The liquid crystal layer 111 in which liquid crystal has been filled is formed between bottom substrate 101 and top substrate 110.

In FIG. 1, the TFT 105 used for LCD panel 10 is directly formed on the bottom substrate 101 near the backlight module (not shown), and the color filter 112 is formed on the top substrate 110. Since TFT array is directly formed on the bottom substrate 101 near the backlight module, the transparency of the LCD panel 10 is decreased. This results in poor picture quality.

In addition, each TFT 105 in the TFT array has a bottom gate structure (as shown in FIG. 1), and fabrication of the conventional LCD panel 10 requires at least five patterning masks. This results in higher manufacturing cost. Furthermore, it is difficult to achieve mass production.

Therefore, increasing the picture quality and simplifying the TFT process steps is a very important issue for the LCD industry.

SUMMARY OF THE INVENTION

An object of the present invention is to provide a LCD panel manufactured by a simplified TFT process to increase the throughput and reduce the manufacturing cost. Moreover, it is an object of the present invention to provide a LCD panel with increased transparency, thereby improving the picture quality.

According to an aspect of the invention, there is provided a LCD panel including: first and second substrates, which oppose each other; a black matrix disposed on the first substrate; a color filter disposed on the first substrate and at least a portion of the black matrix; a composite layer disposed on the color filter and the black matrix; a plurality of pixel elements corresponding to the color filter arranged as array on the composite layer; a transparent conductive layer disposed on the second substrate; and a liquid crystal layer formed between the first and second substrates.

Each of the pixel elements is composed of at least one thin film transistor and one pixel electrode. Moreover, in the present invention, the thin film transistor has a top-gate structure.

BRIEF DESCRIPTION OF THE DRAWINGS

The present invention will become more fully understood from the detailed description given herein below and the accompanying drawings, given by way of illustration only and thus not intended to be limitative of the present invention.

DETAILED DESCRIPTION OF THE INVENTION

Figure 1:
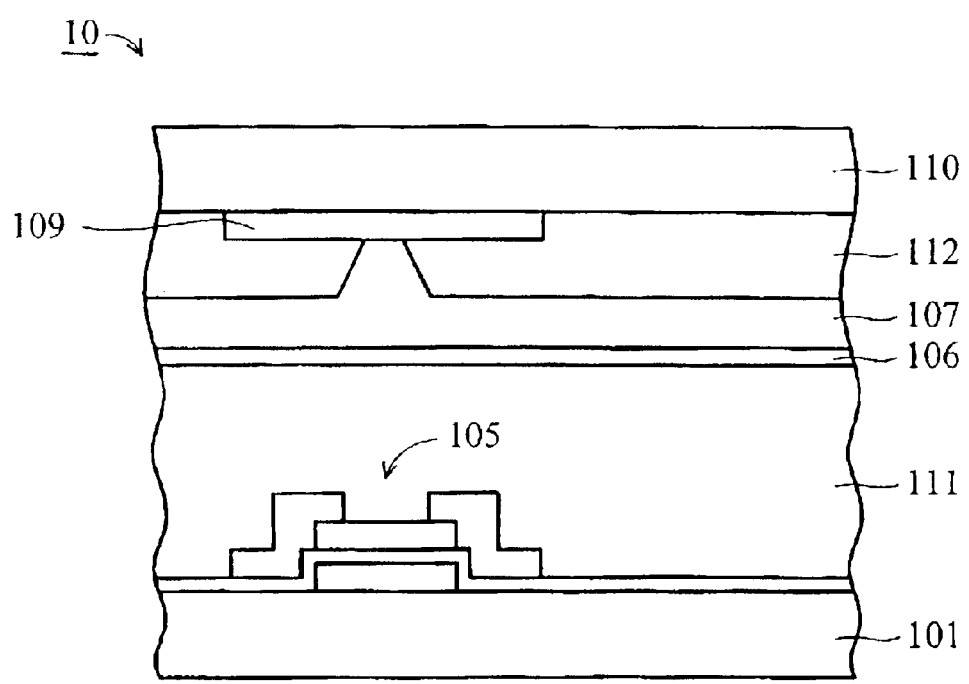
FIG. 1 is a cross-sectional diagram showing a conventional LCD panel structure.
Figure 2:
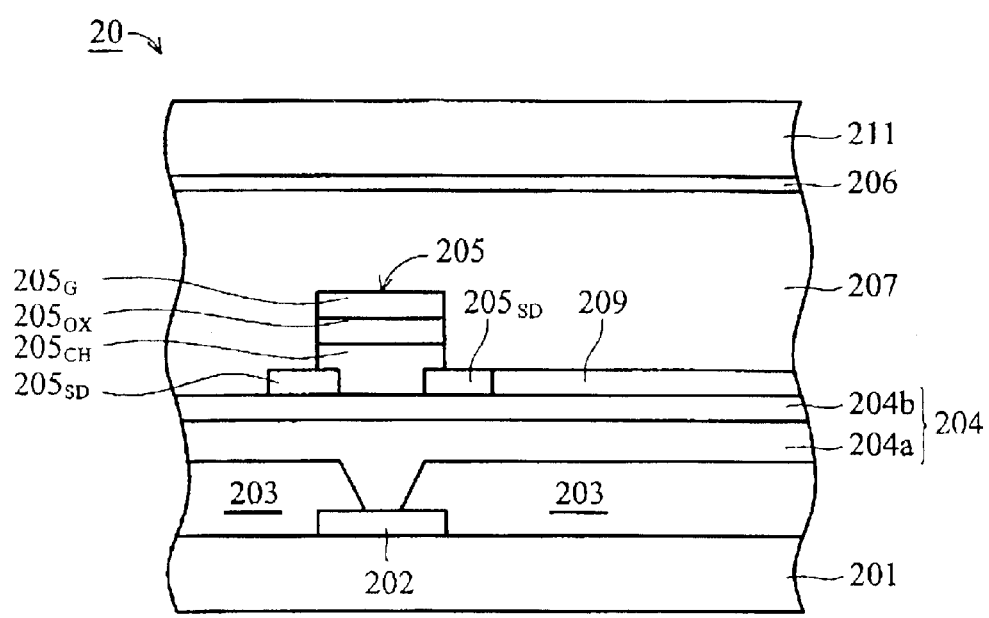
FIG. 2 is a cross-sectional diagram showing a LCD panel structure according to the present invention.

FIG. 2 is a cross-sectional schematic diagram of the LCD panel structure according to the present invention. In the embodiment of the invention, the LCD panel 20 structure includes the follow elements.

First, a first substrate 201 and a second substrate 211 are oppositely disposed to each other. Preferably, the first substrate 201 serves as a bottom substrate (the substrate close to the backlight module), and the second substrate 211 serves as a top substrate. The first and second substrates 201 and 211 are transparent substrate such as glass substrate, quartz substrate or the like. In the embodiment, the glass substrates are used for the first and second substrates 201 and 211.

Next, a black matrix 202 is disposed on the first substrate 201. Functions of the black matrix 202 are described as follow:

(1) Masking the light, which influences the picture quality, to enhance the contrast of the LCD panel;

(2) Surrounding each pixel element in LCD panel to prevent color mixing between red (R), green (G), and blue (B) colors; and (3) Masking the amorphous silicon film (α-Si film) in the TFT to prevent irradiation by stray light.

The materials used for the black matrix 202 can be chromium (Cr), molybdenum (Mo), aluminum (Al), tungsten (W), tantalum (Ta), titanium (Ti) or the like. In the embodiment, chromium metal is used for black matrix 202.

Next, a color fitter 203 is disposed on the first substrate 201 and at least a portion of the black matrix 202. The color filter 203 is composed of three types of color coatings (R, G, and B) according to the specific arrangment, and corresponds to the pixel electrode in the LCD panel 20.

Next, a composite layer 204 is disposed on the color filter 203 and the black matrix 202. In the embodiment, the composite layer 204 includes a planarizing layer 204a and an optionally passivation layer 204b. The planarizing layer 204a is used for eliminating the rough surface due to the color filter 203 and the black matrix 202, and the passivation layer 204b is used for protecting each device structure disposed on the bottom substrate 201 from damage in subsequent process. The planarizing layer 204a can be a transparent insulator such as resin or polymer. The passivation layer 204b can be silicon nitride or silicon oxynitride.

Next, pixel elements corresponding to the color filter 203 are disposed on the composite layer 204 and arranged as an array. Each of the pixel elements is composed of one TFT 205 and one pixel electrode 209. All the TFTs 205 (herein, only one TFT is shown to simplify the diagram) create the TFT array (not shown). Moreover, in the embodiment, each TFT 205 has a top-gate structure. The TFT 205 includes source and drain regions $205_{SD}$, a channel layer $205_{CH}$, and a gate structure (gate $205_G$ and gate insulating layer $205_{OX}$). The source and drain regions $205_{SD}$ are disposed on the composite layer 204 separated by an interval, and one of them is connected to the pixel electrode 209. The channel layer $205_{CH}$ such as an amorphous silicon layer is disposed on the composite layer 204 between the source and drain regions $205_{SD}$, and electrically connected to the source and drain regions $205_{SD}$, respectively. The gate $205_G$ and gate insulating layer $205_{OX}$ are disposed on the channel layer $205_{CH}$. In addition, the TFT 205 may have a bottom-gate structure as known in the prior art.

Next, a transparent conductive layer 206 is disposed on the second substrate 211. In the embodiment, the transparent conductive layer 206 is ITO.

Finally, a liquid crystal layer 207 in which liquid crystal has been filled is formed between the top substrate 211 and the bottom substrate 201.

According to the LCD panel 20 of the invention, the TFT 205 having a top-gate structure can be defined by lithography using two to four patterning masks only. Therefore, the throughput can be increased, and the manufacturing cost can be reduced. Moreover, since the black matrix 202 used for masking the TFT 205 to prevent irradiation by stray light and the TFT 205 are formed on the same substrate 201, the distance between them can be closed to reduce the area of the black matrix 202. Accordingly, the effective display area for LCD panel 20 can be increased.

Also, since no black matrix or color filter is disposed on the top substrate 201, the transparence for the LCD panel 20 can be increased without raising the power.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal display panel, comprising:
   first and second substrates which oppose each other;
   a black matrix disposed on the first substrate;
   a color filter disposed on the first substrate and at least a portion of the black matrix;
   a composite layer disposed on the color filter and the black matrix;
   a plurality of thin film transistors corresponding to the color filter arranged as array on the composite layer;
   a transparent conductive layer disposed on the second substrate; and
   a liquid crystal layer formed between the first and second substrates.

2. The display panel as claimed in claim 1, further comprising a plurality of pixel electrodes corresponding to the color filter arranged as array on the composite layer.

3. The display panel as claimed in claim 2, wherein the thin film transistor comprises:
   source and drain regions disposed on the composite layer separated by an interval, and one of them connected to the pixel electrode;
   a channel layer disposed on the composite layer between the source and drain regions, and electrically connected to the source and drain regions, respectively; and
   a gate insulating layer and a gate structure disposed on the channel layer.

4. The display panel as claimed in claim 2, wherein the black matrix is disposed underlying each the thin film transistor.

5. The display panel as claimed in claim 3, wherein the black matrix is overlapped by the channel layer.

6. The display panel as claimed in claim 1, wherein the composite layer comprises a planarizing layer and an optional passivation layer disposed on the color filter and the black matrix.

7. The display panel as claimed in claim 6, wherein the planarizing layer is an organic transparent insulator, and the passivation layer is an insulating layer.

8. The display panel as claimed in claim 7, wherein the planarizing layer is resin or polymer.

9. The display panel as claimed in claim 7, wherein the passivation layer is silicon nitride or silicon oxynitride.

10. The display panel as claimed in claim 1, wherein the first and second substrates are transparent substrates.

11. The display panel as claimed in claim 1, wherein the transparent conductive layer is indium tin oxide.

12. The display panel as claimed in claim 1, wherein the channel layer is amorphous silicon ($\alpha$-Si).

13. A liquid crystal display panel, comprising:
    first and second substrates which oppose each other;
    a black matrix disposed on the first substrate;
    a color filter disposed on the first substrate and at least a portion of the black matrix;
    a composite layer disposed on the color filter and the black matrix;
    a thin film transistor array corresponding to the color filter arranged on the composite layer, each transistor of the thin film transistor array having a top-gate structure;
    a transparent conductive layer disposed on the second substrate; and
    a liquid crystal layer formed between the first and second substrates.

14. The display panel as claimed in claim 13, wherein the black matrix is disposed underlying each of the thin film transistors.

15. The display panel as claimed in claim 13, wherein the composite layer comprises a planarizing layer and an optional passivation layer disposed on the color filter and the black matrix.

16. The display panel as claimed in claim 15, wherein the planarizing layer is an organic transparent insulator, and the passivation layer is an insulating layer.

17. The display panel as claimed in claim 16, wherein the planarizing layer is resin or polymer.

18. The display panel as claimed in claim 16, wherein the passivation layer is silicon nitride or silicon oxynitride.

19. The display panel as claimed in claim 13, wherein the first and second substrates are transparent substrates.

20. The display panel as claimed in claim 13, wherein the transparent conductive layer is indium tin oxide.

21. A substrate structure for liquid crystal display, comprising:
- a substrate;
- a black matrix disposed over the substrate;
- a color filter disposed over the substrate and covering at least a portion of the black matrix;
- a composite layer disposed on the color filter and the black matrix; and
- a plurality of thin film transistors disposed over the composite layer and respectively connecting to a corresponding pixel electrode overlying the color filter.

22. The substrate structure for liquid crystal display as claimed in claim 21, wherein the thin film transistor comprises:
- source and drain regions disposed on the composite layer separated by an interval, and one of them connected to the pixel electrode;
- a channel layer disposed on the composite layer between the source and drain regions, and electrically connected to the source and drain regions, respectively; and
- a gate insulating layer and a gate structure disposed on the channel layer.

23. The substrate structure for liquid crystal display as claimed in claim 21, wherein the black matrix is disposed underneath the thin film transistor.

24. The substrate structure for liquid crystal display as claimed in claim 22, wherein the black matrix is overlapped by the channel layer.

25. The substrate structure for liquid crystal display as claimed in claim 21, wherein the composite layer comprises a planarizing layer and an optional passivation layer disposed on the color filter and the black matrix.

26. The substrate structure for liquid crystal display as claimed in claim 25, wherein the planarizing layer is an organic transparent insulator, and the passivation layer is an insulating layer.

27. The substrate structure for liquid crystal display as claimed in claim 26, wherein the planarizing layer is resin or polymer.

28. The substrate structure for liquid crystal display as claimed in claim 26, wherein the passivation layer is silicon nitride or silicon oxynitride.

29. The substrate structure for liquid crystal display as claimed in claim 21, wherein the substrate is made of a transparent material.

30. The substrate structure for liquid crystal display as claimed in claim 21, wherein the channel layer is amorphous silicon ($\alpha$-Si).

* * * * *